(12) United States Patent
Barber (10) Patent No.: US 11,228,626 B1
(45) Date of Patent: Jan. 18, 2022

(54) REQUEST STREAM

(71) Applicant: Facebook, Inc., Menlo Park, CA (US)

(72) Inventor: Jeffrey Michael Barber, Bainbridge Island, WA (US)

(73) Assignee: Facebook, Inc., Menlo Park, CA (US)

( * ) Notice: Subject to any disclaimer, the term of this patent is extended or adjusted under 35 U.S.C. 154(b) by 73 days.

(21) Appl. No.: 16/564,246

(22) Filed: Sep. 9, 2019

(51) Int. Cl.
*H04L 29/06* (2006.01)

(52) U.S. Cl.
CPC ...... *H04L 65/1086* (2013.01); *H04L 65/4076* (2013.01); *H04L 65/602* (2013.01); *H04L 65/605* (2013.01); *H04L 65/607* (2013.01)

(58) Field of Classification Search
CPC ............. H04L 65/1086; H04L 65/4076; H04L 65/602; H04L 65/605; H04L 65/607
USPC ......................................................... 709/231
See application file for complete search history.

(56) References Cited

U.S. PATENT DOCUMENTS

| | | | |
|---|---|---|---|
| 10,095,547 B1 * | 10/2018 | Kulkarni ................. | G06F 9/455 |
| 2004/0236846 A1 | 11/2004 | Alvarez et al. | |
| 2011/0082924 A1 * | 4/2011 | Gopalakrishnan ...... | H04L 65/80 709/223 |
| 2015/0106841 A1 * | 4/2015 | Wolf .................. | H04N 21/8455 725/32 |
| 2015/0244761 A1 * | 8/2015 | Tsyganok ................ | G06F 11/08 709/219 |
| 2015/0271233 A1 * | 9/2015 | Bouazizi .......... | H04N 21/44209 709/219 |
| 2015/0326901 A1 * | 11/2015 | Tiraspolsky ........... | H04N 21/24 725/31 |
| 2016/0198012 A1 * | 7/2016 | Fablet ..................... | H04L 67/02 709/231 |
| 2016/0314037 A1 * | 10/2016 | Lippincott .............. | G06F 11/00 |
| 2017/0359619 A1 * | 12/2017 | Wang ................. | H04N 21/4788 |
| 2018/0242280 A1 * | 8/2018 | Axmon ............... | H04L 41/0823 |
| 2021/0014295 A1 * | 1/2021 | Platter .............. | H04N 21/26241 |

OTHER PUBLICATIONS

Extended European Search Report received for EP Patent Application Serial No. 20195043.3 dated Nov. 5, 2020, 11 pages.

* cited by examiner

*Primary Examiner* — Schquita D Goodwin
(74) *Attorney, Agent, or Firm* — FisherBroyles, LLP (57) ABSTRACT

The disclosed computer-implemented method may include receiving, at a server, a request from a client for live data. The method may include establishing, at the server, a data transfer promise that is embedded in a live data stream. The live data stream may include the requested live data. The method may further include transferring the live data stream with the embedded data transfer promise to the client, receiving an indication that the status of the embedded data transfer promise was changed during transmission of the live data stream and providing, to the client, an indication of the current status of the live stream based on the received status indication. Various other methods, systems, and computer-readable media are also disclosed.

20 Claims, 9 Drawing Sheets

REQUEST STREAM

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to methods and systems for establishing and monitoring a live data stream. Prior conventional approaches to streaming live data often result in long time delays when the data does not reach its destination. For example, a client computing device may request to receive a live feed of information from a server. The server may provide the data to the client computing device through a host of intermediary data transfer nodes. These nodes may be located substantially anywhere in the world, and there may be any number of such nodes positioned on the data transfer route between the server and the client device. If the data stream were to fail at any of these intermediary nodes, the node would report the failure back to the server and the server would restart the live feed. This round-trip time from the intermediary node back to the server and the time taken to restart the live feed may frustrate the end user.

Moreover, in traditional systems, the live feed may be incapable of providing any guarantees that the user is getting any or all of the live data that they requested. The server may transmit the data as it is received, but the server may not have any way of guaranteeing that the live feed data reached its destination (e.g., the client device). Still further, in such conventional systems, the server may have no way of monitoring the live feed data once it has been transmitted to the intermediary nodes. As such, the server may not be aware of the transfer status of the live data once the data has been initially sent to the intermediary nodes. The server may only be made aware of a failure at an intermediary node once that intermediary node alerts the server, at which time the server can restart the live data feed.

As will be explained in greater detail below, embodiments of the present disclosure may allow a server to provide live feed data to a client device and guarantee that the data is reaching the client device. Moreover, using the embodiments described herein, the live data feed may be restarted at any of the intermediary nodes without needing to restart the live feed at the server. Still further, the server may be able to monitor the live feed data and determine whether the live feed data is reaching the client device throughout the duration of the live feed. Features from any of the embodiments described herein may be used in combination with one another in accordance with the general principles described herein. These and other embodiments, features, and advantages will be more fully understood upon reading the following detailed description in conjunction with the accompanying drawings and claims.

Figure 1:
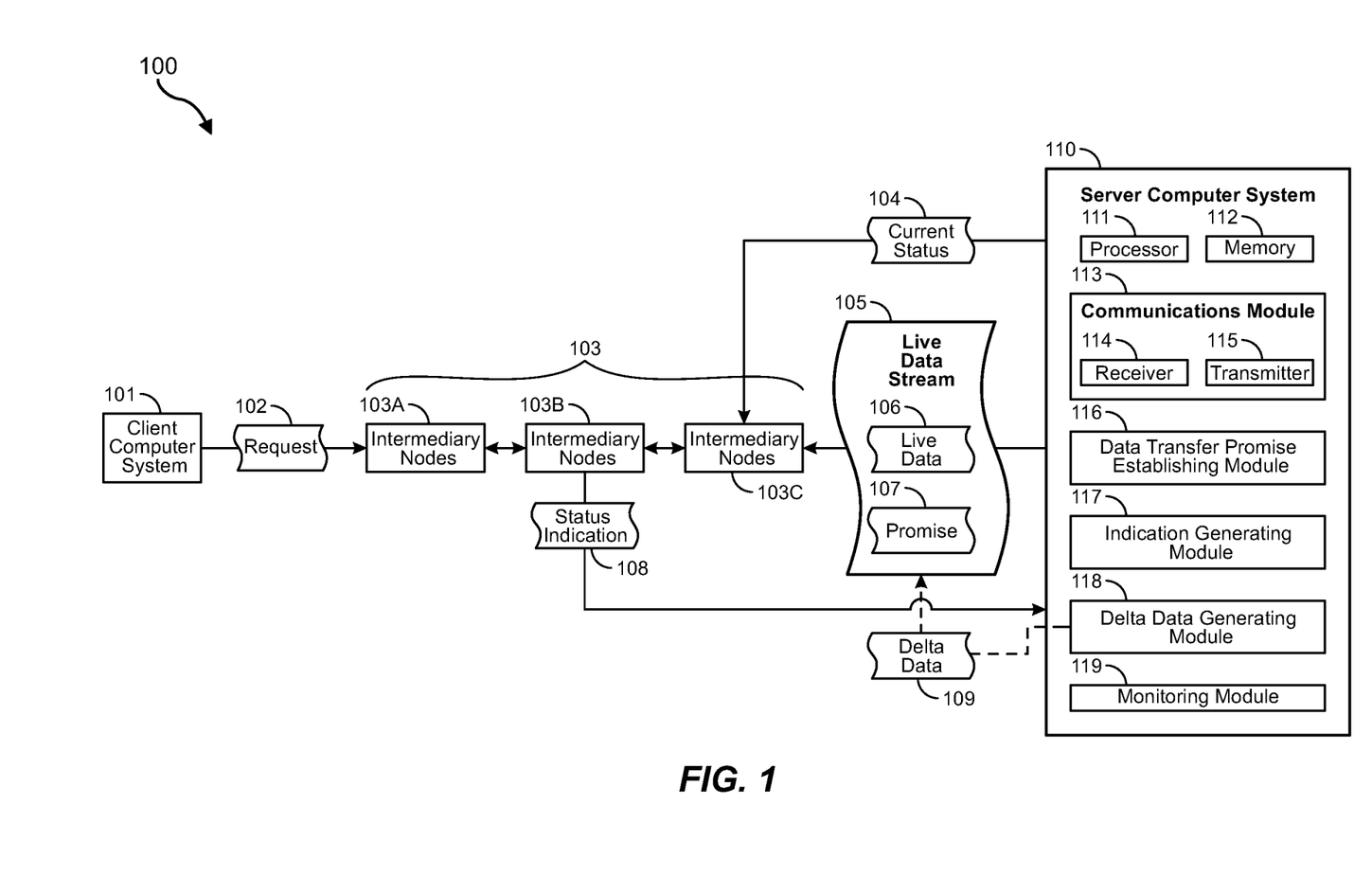
FIG. 1 illustrates a computing environment in which at least some of the embodiments herein may operate.

The following will provide, with reference to FIGS. 1-15, detailed descriptions of various computing and networking architectures in which the embodiments described herein may operate. FIG. 1, for example, illustrates a computer networking environment 100 in which data may be transferred from a server to a client. For instance, server computer system 110 (or simply "server" herein) may be configured to transmit data 105 to a client computer system 101 (or simply "client" herein). The server 110 and client 101 may each be computing systems with processors (e.g., 111), memory (e.g., 112), communications modules (e.g., 113) with hardware receivers (e.g., 114) and/or transmitters (e.g., 115), along with potentially other hardware or software modules configured to perform specified functions.

The server 110 may, for example, have a data transfer promise establishing module 116. The data transfer promise establishing module 116 may establish a data transfer promise 107 for a given transmission of data. The data transfer promise 107 may be implemented to ensure that the data reaches its specified destination. For example, if the client 101 requests certain live data (e.g., requests live data 106 in request 102), the server 110 may provide that live data 106 in a live data stream 105. The live data stream 105 may not have data at all times, but when new live data comes in that was requested by the client, that live data 106 may be transmitted as part of the live data stream 105. Although only one live data stream is shown as being transferred from the server to the client, and although only one client is shown in FIG. 1, it will be understood that the server 110 may provide any number of live data streams to any number of clients, in sequence or in parallel, synchronously or asynchronously. Each of these live data streams 105 may include an embedded promise 107 that allows the server to monitor and track the status of the live data stream as it is transmitted to the client 101. Moreover, the promise 107 may allow the live data stream 105 to be restarted at any of the intermediary nodes 103.

For example, if the server 110 begins transmitting a live data stream 105 to the client, the live data stream may hop through many different intermediary nodes 103 on its way to the client. At times the live data stream 105 may take the same path through the intermediary nodes 103 and, at other times, the live data stream may take a different path through the intermediary nodes 103. As will be explained further below, the embedded promise 107 that is part of the live data stream 105 may allow any of the intermediary nodes (collectively 103 or individually 103A, 103B, or 103C) to restart the live data stream 105 at that node. For instance, if the live data stream 105 were to fail for some reason at intermediary node 103B, that node may be configured to restart the live data stream 105 without having to request the server 110 to restart the stream. A status indication 108 may be sent to the server 110 notifying the server that the live data stream 105 failed at node 103B and was restarted, but the server may not need to change anything about the way it is transmitting the live data stream and may avoid the time and computing resources that would otherwise be needed to restart the live data feed 105. These embodiments will be described further below with regard to method 200 of FIG. 2 and the embodiments illustrated in FIGS. 3-15.

Figure 2:
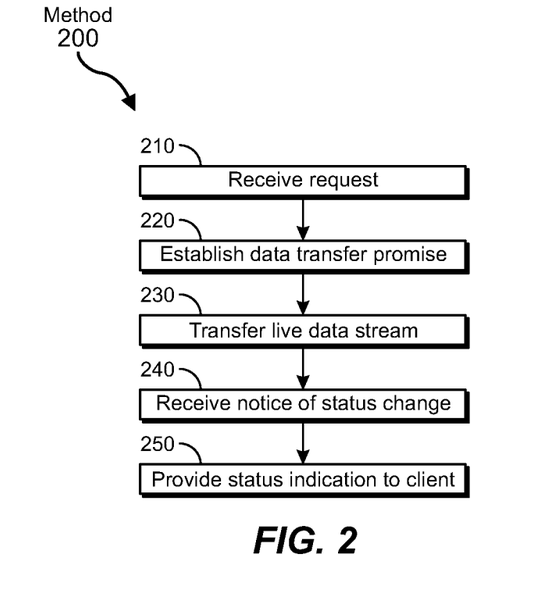
FIG. 2 illustrates a flow diagram of an exemplary method for establishing and monitoring a live data stream.

FIG. 2 is a flow diagram of an exemplary computer-implemented method 200 for establishing and monitoring a live data stream. The steps shown in FIG. 2 may be performed by any suitable computer-executable code and/or computing system, including the system(s) illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210, one or more of the systems described herein may establish and monitor a live data stream. For example, the communications module 113 of server computer system 110 may receive a request 102 from a client computer system 101 for various portions of live data 106. The live data 106 may be streaming video data, streaming audio data, social media posts, text messages, comments on videos or social media posts, or any other type of data that may be transmitted live. In some cases, the live data 106 may be transferred as a continuous stream in live data stream 105. In other cases, the live data may be sent continually as it is received or created. For example, the client 101 may request to receive comments on a social post or video. The comments may come in over the course of time. Some comments may come in in bunches, while other times, the live data stream 105 for the comments may be silent. Regardless of whether the live data stream 105 includes continuous data or sporadic data, the server 110 may transfer the live data 106 as it is received.

The method 200 of FIG. 2 may next include, at step 220, establishing, at the server 110, a data transfer promise 107 that is embedded in the live data stream 105. The live data stream 105 may include the requested live data 106, along with perhaps other data. The data transfer promise 107 may be established during creation of the live data stream 105. In some cases, the data transfer promise 107 may be part of a protocol that is used to transfer the live data 106. Additionally or alternatively, the data transfer promise 107 may be embedded into the data packets that carry the live data 106 to the client. In some cases, the promise may be part of each data packet, and in other cases, the data transfer promise 107 may only be part of certain data packets within the live data stream 105. In some cases, the data transfer promise 107 may be included in the data packets as a portion of metadata that is included in some or all of the data packets that make up the live data stream 105.

Because each (or at least some) of the data packets in the live data stream 105 include the data transfer promise 107, each (or at least some) of the intermediary nodes 103 may be able to determine which live data stream the packets are part of and may determine whether the data transfer promise 107 is still intact. The data transfer promise 107 may indicate a promise between the server 110 and the client 101 that the live data 106 will be transferred from the server to the client as it is received or created. Once the data transfer promise 107 has been established, the server 110 may be able to guarantee to the client 101 that, if the live data stream 105 has any data, the client will be receiving that data.

If, for some reason, the live data stream 105 is interrupted in any of the intermediary nodes 103, those nodes may detect the promise and restart the data transfer at that intermediary node. Moreover, because of the data transfer promise 107, some or all of the intermediary nodes may know the current status of the live data stream 105. If the live data stream 105 is functioning at any given intermediary node 103, that node may provide a status indication 108 indicating that the stream is working and the data transfer promise 107 is intact. If the stream is not working at a particular intermediary node, that node may send a status indication 108 indicating that the live data stream 105 has stopped working at that node and that a restart at that node was successful or not successful. If the restart at that node was not successful, the server 110 may restart the live data stream 105.

Thus, at step 220 of method 200, the data transfer promise establishing module 116 may establish a data transfer promise 107 for the live data stream 105. The communications module 113 may then transfer, at step 230, live data stream 105 with the embedded data transfer promise 107 to the client 101. At some point after the live data stream 105 has begun, the communications module 113 of the server 110 may receive, at step 240, an indication 108 that the status of the embedded data transfer promise 107 was changed during transmission of the live data stream (e.g., the transmission failed at a certain node and was restarted). The indication generating module 117 of server 110 may then provide to the client 101, at step 250, an indication of the current status 104 of the live stream based on the received status indication. These concepts will be explained in greater detail below with regard to FIGS. 3-15.

Figure 3:
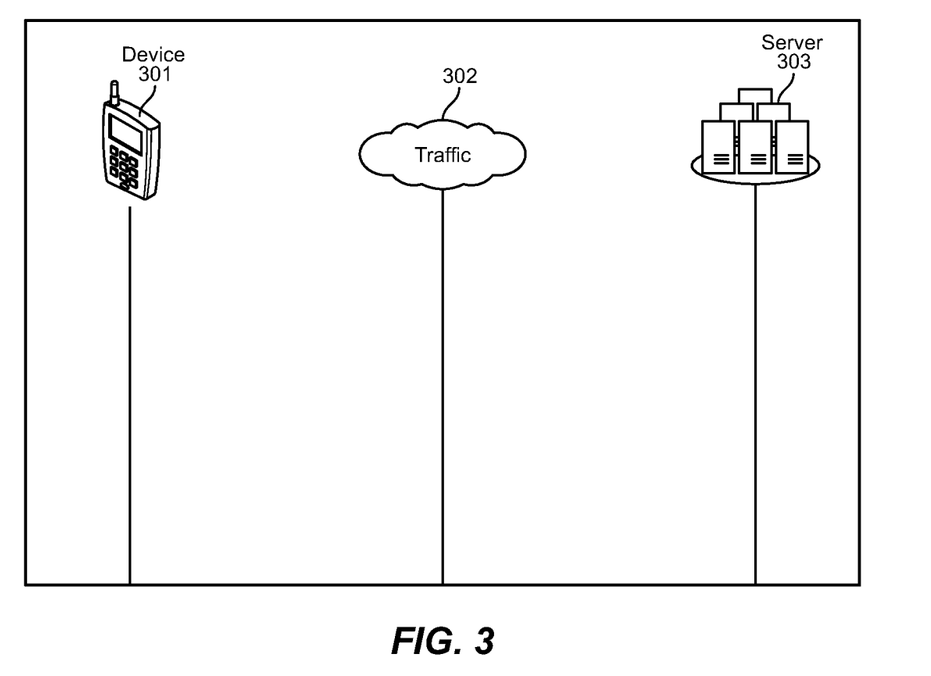
FIG. 3 illustrates a networking architecture in which embedded data transfer promises are implemented to track and resolve issues in a live data stream.

FIG. 3 illustrates a computer networking environment that includes a client device 301 (e.g., a smartphone, laptop, PC, or any other type of computing system), a traffic area 302 that may include one or more intermediary nodes (e.g., nodes 103 from FIG. 1). Traffic 302 is illustrated as a cloud that includes multiple interconnected devices that route data including requests from client devices to servers and from servers to client devices. The server 303 may be a terminal server or any other type of computer system designed to handle data requests. The client device 301, traffic 302, and server 303 may provide a landscape and operating environment for the embodiments described below.

In some embodiments, a user, computer system or other entity may express an interest in receiving live data at their device. For example, a user using client device 301 may look at their social media feed and see a post. In some cases, the client device 301 may interpret looking at the social media post as a desire for receiving new comments on the post as the comments appear. As such, the client device 301 may issue a request for live comments (or other live data). This request (e.g., 102 from FIG. 1) may exit the client device 301 and head into traffic 302 (depicted as a cloud). Within traffic 302, the intermediary nodes (e.g., nodes 103 in FIG. 1) may inspect a header of the request (e.g., a JavaScript Object Notation (JSON) header) and find an appropriate server to service live comments (e.g., server 303). Traffic 302 may then proxy the relationship between the server 303 handling the request and the client device 301 waiting for responses.

Figure 4:
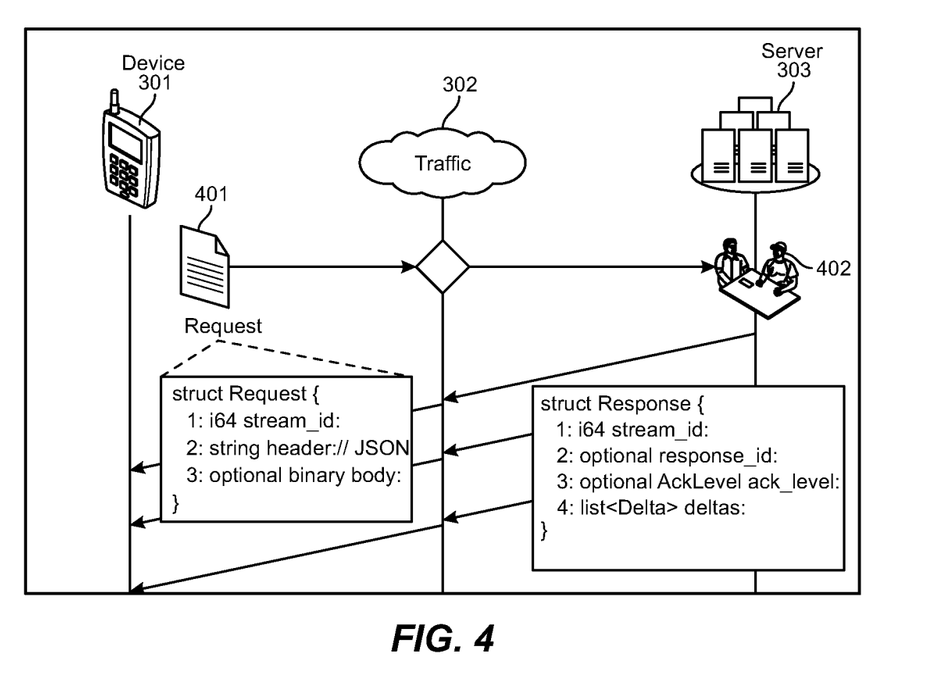
FIG. 4 illustrates an alternative networking architecture in which embedded data transfer promises are implemented to track and resolve issues in a live data stream.
Figure 5:
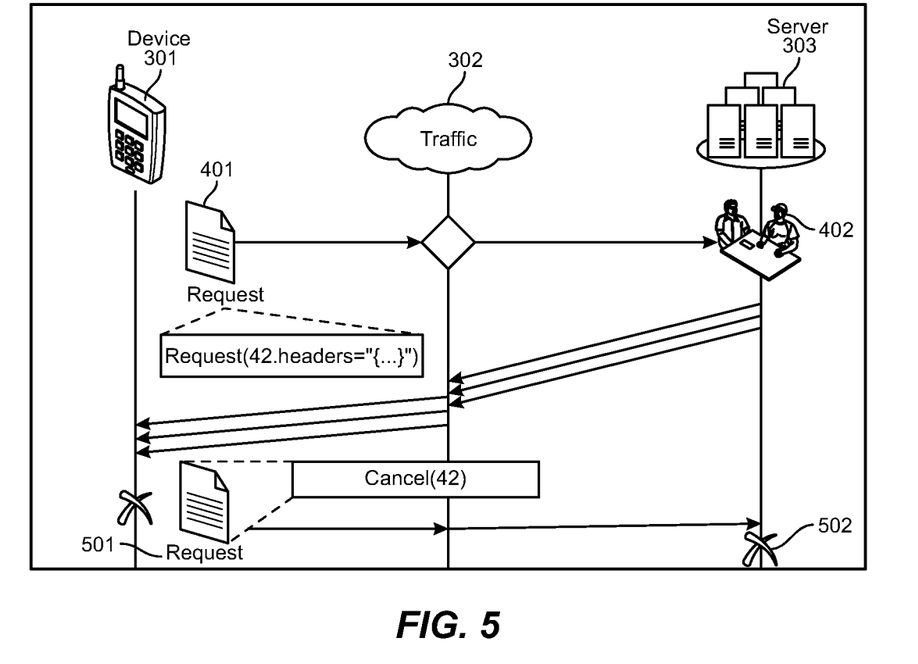
FIG. 5 illustrates an alternative networking architecture in which embedded data transfer promises are implemented to track and resolve issues in a live data stream.

The server 303 may now have the responsibility to satisfy the request as live data (e.g., 106 of FIG. 1) is received or created over time. In the case of "live comments," the server 303 may emit a response each time a user posts a new comment. For example, as shown in FIG. 4, the request 401 sent from the client device 301 may map into a series of responses 402 in the live data stream (e.g., live data stream 105 of FIG. 1) that may be separated by various intervals of time. In some cases, no live data may be generated (e.g., no comments are received for the post) and, as such, the server 303 may not provide data based on the request. In other cases, the live data may be substantially continuous. Accordingly, in the embodiments herein, it will be understood that the data in a live data stream may arrive at substantially any time interval, including the extremes of receiving no data or receiving substantially constant data.

In some embodiments, a stream identifier (e.g., "stream_id") may be any type of data or identifier that uniquely identifies communication between the client device 301, traffic 302, and server 303. In some embodiments, the traffic cloud 302 may remap or alter the stream identifier before reaching the terminal server. A string header in the request 401 may be a JSON header and may be open to the traffic cloud 302 to parse and inspect. At least in some embodiments, routing decisions may be made by referencing the header and/or authentication information from the device established during the client-server. The body of the client request 402 may be opaque to the traffic cloud 302 and may have no formal definition beyond an array of bytes. This may allow the client device 301 to send arbitrary data to the remote server 303.

A response identifier (e.g., "response_id") in the response 402 may be similar to the stream identifier except that the response identifier may be controlled by the server 303. An acknowledgement level (e.g., "AckLevel") sent in the response 402 may specify one of many different levels of acknowledgement that may be sent between the client and server. Still further, delta data (e.g., 109 from FIG. 1) may be included in the response 402. The delta data may include various types of information or other data. At least in some cases, the delta data may comprise a batch of deltas. A "delta" may refer to a union of various items, as will be explained further below. Having a batch of deltas allows the deltas to be joined so that they are network-atomic. In other words, the batch of deltas remains together and is not broken down into subunits.

After the user of the client device 301 has viewed the requested live data (e.g., 106 of FIG. 1) for a certain amount of time, the user may wish to move on to other live data. In the case of live comments, as described above, the user may shift their attention to another post or to something else entirely. In some embodiments, this shifting of attention may be interpreted by the device as a cancellation of the original request to see live comments. Accordingly, the client device 301 may (either automatically or at the direct request of the user) issue a cancellation 501 to the live data stream. This cancel request 501 may flow from the client device 301 to traffic 302 which may find the relationship to the server 303 and then proxy the cancellation request along to the server. When the server 303 receives the cancellation request at 502, the server may stop sending the live data 106 to the client device 301.

In some embodiments, if the client device 301 disconnects from the server, then traffic 302 may interpret the disconnection as an implicit cancellation for all streams. This may help the server to formally discontinue the live data stream 105. In at least some embodiments, when the client device 301 reconnects to the server 303, any active requests may be automatically re-issued. In such cases, the server 303 may begin to again send the requested live data stream 105 to the client device 301. If a request for live data is input into the client device 301 while the device is disconnected from traffic 302, the request may be held in a data store until the request can be sent to traffic 302. As such, clients may be able to make a request once and may not need to concern themselves with further connections to the back-end server or manually initiating restarts. Rather, as soon as the user is again connected to the traffic cloud 302, the pending requests may be automatically sent to the server 303 and fulfilled by the server.

Figure 6:
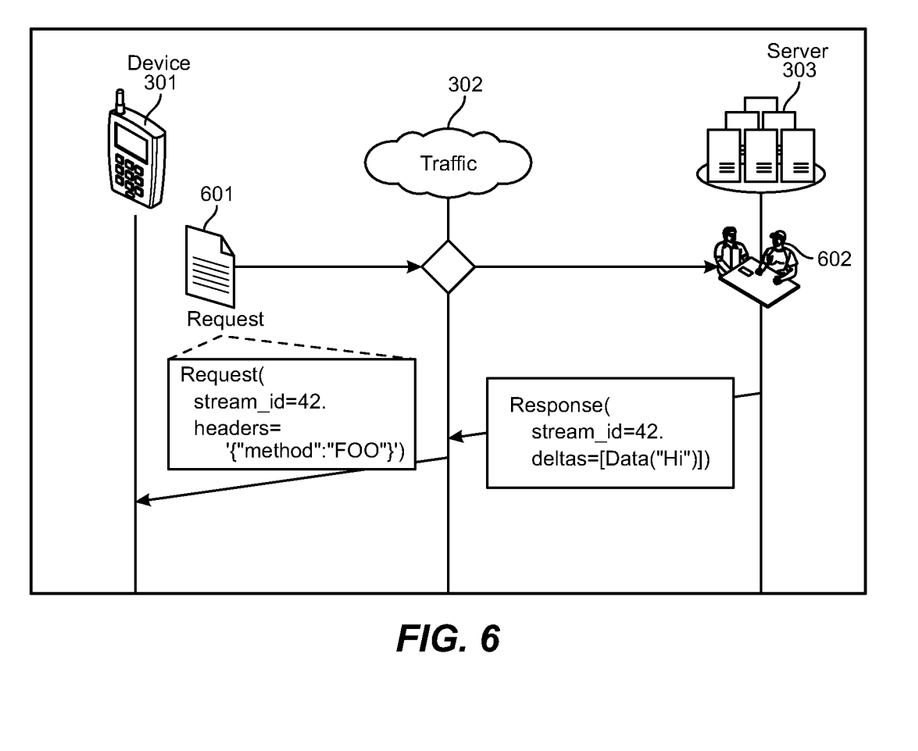
FIG. 6 illustrates an alternative networking architecture in which embedded data transfer promises are implemented to track and resolve issues in a live data stream.

FIG. 6 illustrates an embodiment in which a client device 301 issues a request 601 for live data. Upon issuing the request 601, the client device 301 may wait to receive the live data. The live data may be sent to the client device 301 via a data delta in the response 602. In some embodiments, the data delta may be an opaque blob of bytes. In other cases, the data delta may be more complex. As the server 303 emits data deltas, the deltas may be used to log the actions taken by the server and may be used to determine the current condition on the server. Furthermore, the deltas may be used to debug any problems that may arise on the server 303. This logging of actions taken by the server 303 may be optional and may require either an implicit opt-in (e.g., enabled for employees or certain roles or groups) or an explicit opt-in (e.g., a flag in the request). This relationship may be controlled by the server 303 or by policies.

Figure 7:
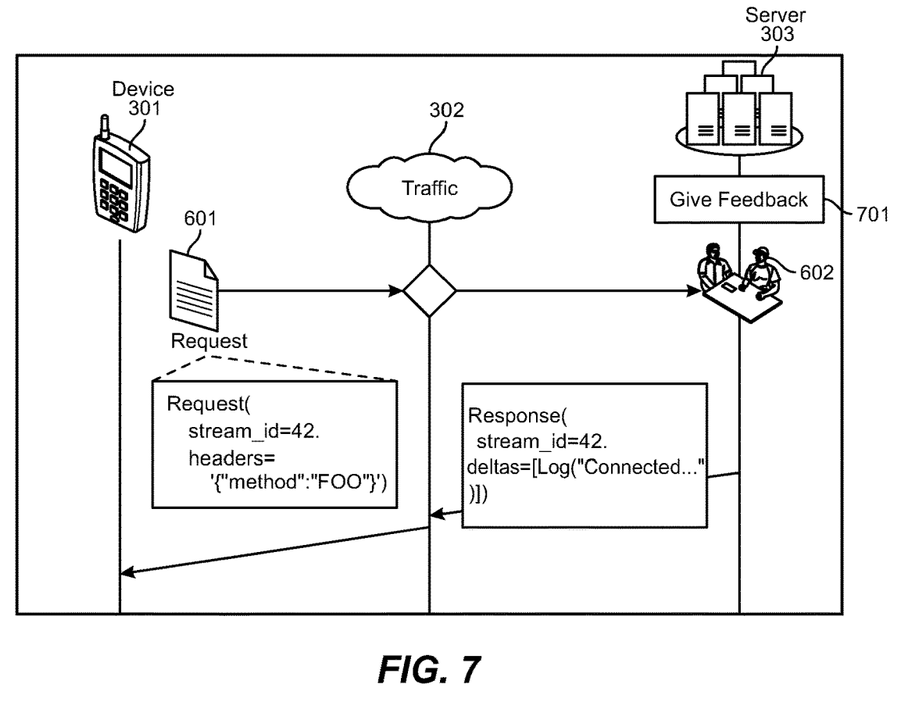
FIG. 7 illustrates an alternative networking architecture in which embedded data transfer promises are implemented to track and resolve issues in a live data stream.
Figure 8:
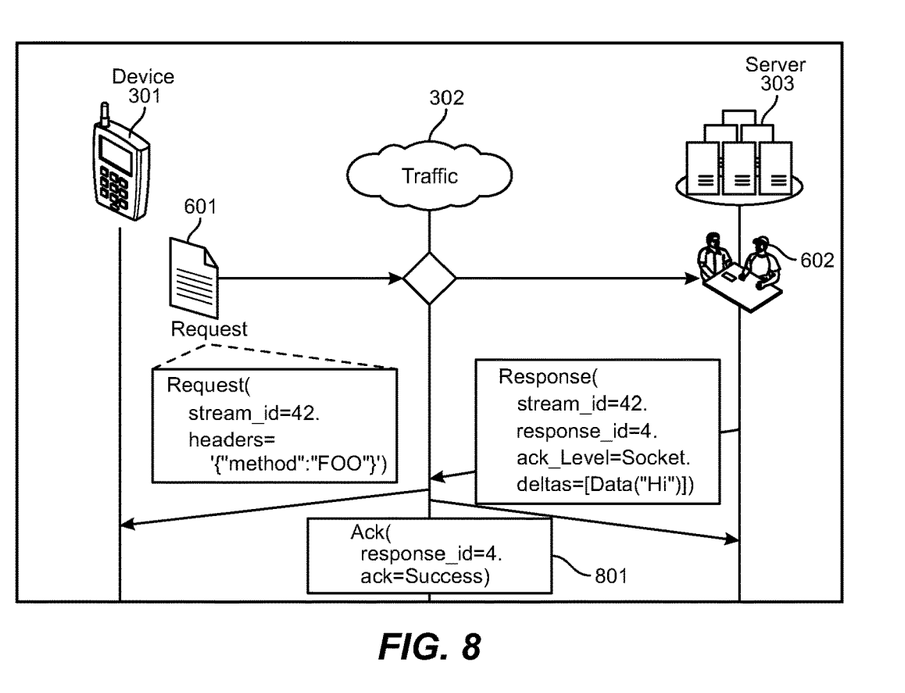
FIG. 8 illustrates an alternative networking architecture in which embedded data transfer promises are implemented to track and resolve issues in a live data stream.

FIG. 7 illustrates an embodiment in which a server 303 may determine how far a given data packet traveled on its path to the device 301. The server 303 may send feedback data 701 to the device in the form of a delta (or batch of deltas) to determine how far through traffic 302 the response traveled. Various functions and identifiers may be used including response_id and ack_level, as shown in FIG. 8. "Response_id" (e.g., in 801) may refer to a server-unique token configured to wait for an acknowledgement from traffic 302. "Ack_level" may include different options including "BestEffort." With BestEffort set as the ack_level, the acknowledgement that the server 303 will receive may be equivalent to an indication that traffic 302 received the response. This may indicate to the backend server 303 understand how traffic is handling the response.

In the response 602 of FIG. 8, the ack_level is set to "Socket." With Socket as the ack_level, traffic 302 may acknowledge whether or not the response was written to the connection for the device 301. In this scenario, the only way the response can fail is if the device 301 goes offline immediately. This model may have latency characteristics similar to BestEffort with slightly more cost and more usage of network bandwidth. Once traffic 302 sends the Ack to the device 301, the server 303 may learn that fact quickly.

Figure 9:
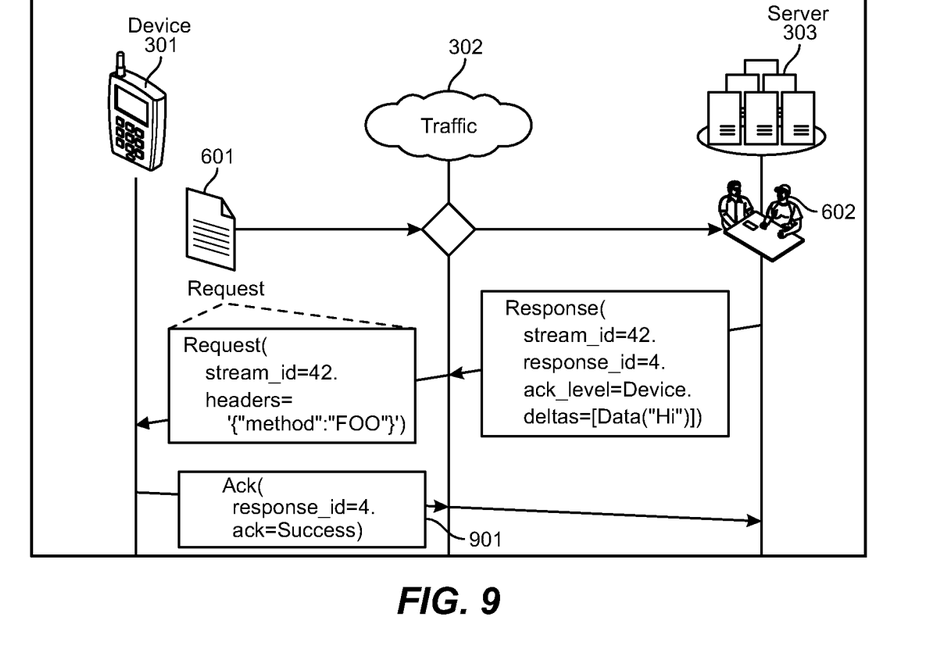
FIG. 9 illustrates an alternative networking architecture in which embedded data transfer promises are implemented to track and resolve issues in a live data stream.

FIG. 9 illustrates an embodiment in which the ack_level is set to "Device." With Device as the ack_level, traffic 302 may acknowledge all the way to the device 301. This acknowledgement (e.g., 901) may be more resource-expensive since this acknowledgement asks the client to do work beyond accepting data. This acknowledgment may also express the full round-trip latency to the server.

Figure 10:
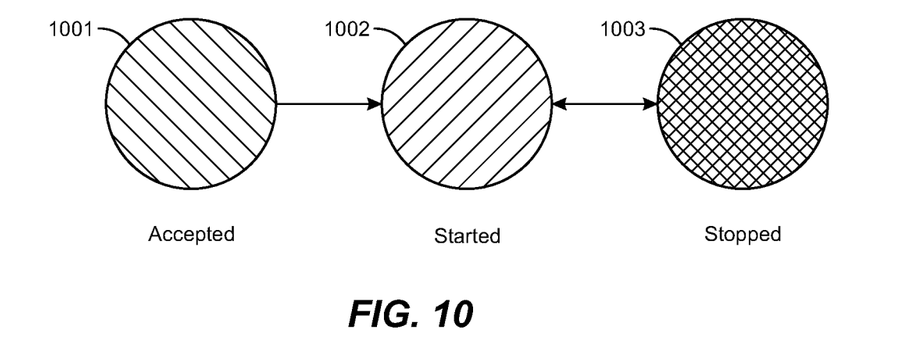
FIG. 10 illustrates an alternative networking architecture in which embedded data transfer promises are implemented to track and resolve issues in a live data stream.

Using these different acknowledgement levels, embodiments of the device, traffic, and server may implement server-side flow acknowledgements end to end from the server 303 to the device 301. For example, flow control or a "FlowStatus" indicator may indicate whether data should be received currently at the client device 301, whether the request was proper, and whether other traffic elements are working as intended. The FlowStatus indicator or delta may be an enumeration of "Accepted," "Started," and "Stopped." As shown in FIG. 10, a state machine may include Accepted at 1001, Started at 1002, and Stopped at 1003. Ideally, the server 303 may validate the request (e.g., 601 of FIG. 9) and emit Accepted (e.g., 1001) as a FlowStatus delta as soon as possible. This Accepted signal 1001 may be used to indicate that the request 601 is good. Since FlowStatus is a delta, this may be combined with device-level acknowledgements to let the server 303 know that the client 301 is in the right position to start receiving data.

Figure 11:
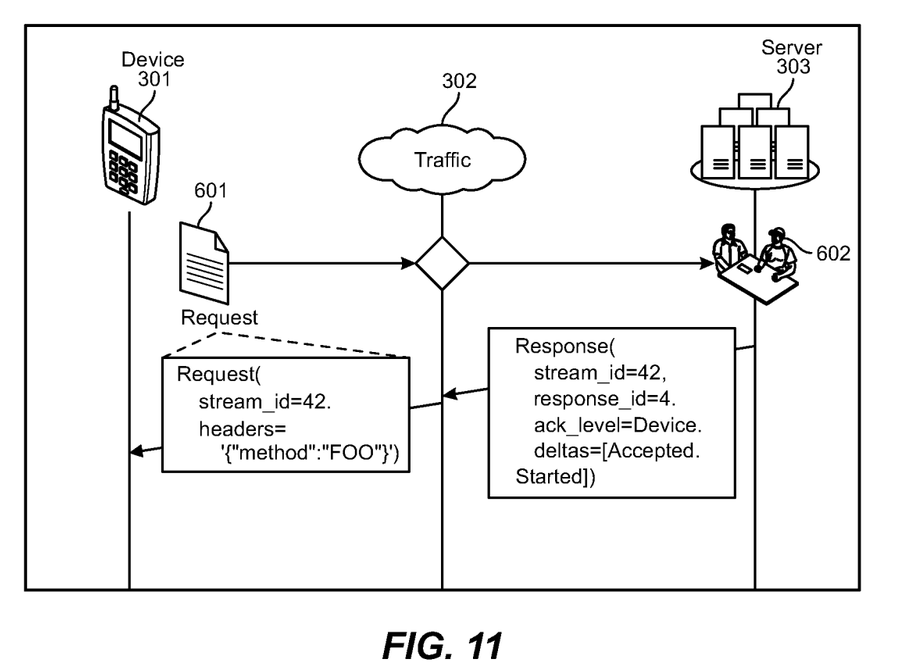
FIG. 11 illustrates an alternative networking architecture in which embedded data transfer promises are implemented to track and resolve issues in a live data stream.

As shown in FIG. 11, the server 303 may provide data. However, just providing data may be insufficient as the embodiments described may be designed to provide a guarantee that data will arrive if there is data to be seen. As such, Started 1002 and Stopped 1003 values are implemented for FlowStatus. These values may mirror a guarantee by the server 303 that the client 301 will be receiving data. If the client receives a Started FlowStatus indicator 1002, then the back-end server 303 handling the request may be making a hard guarantee that data will reach the client when the data becomes available. If the client receives a Stopped indicator 1003, then the client is made aware that promise was broken somewhere (e.g., in traffic 302) and that the server 303 along with traffic and the device's client 301 are working together to reinstate the promise.

Figure 12:
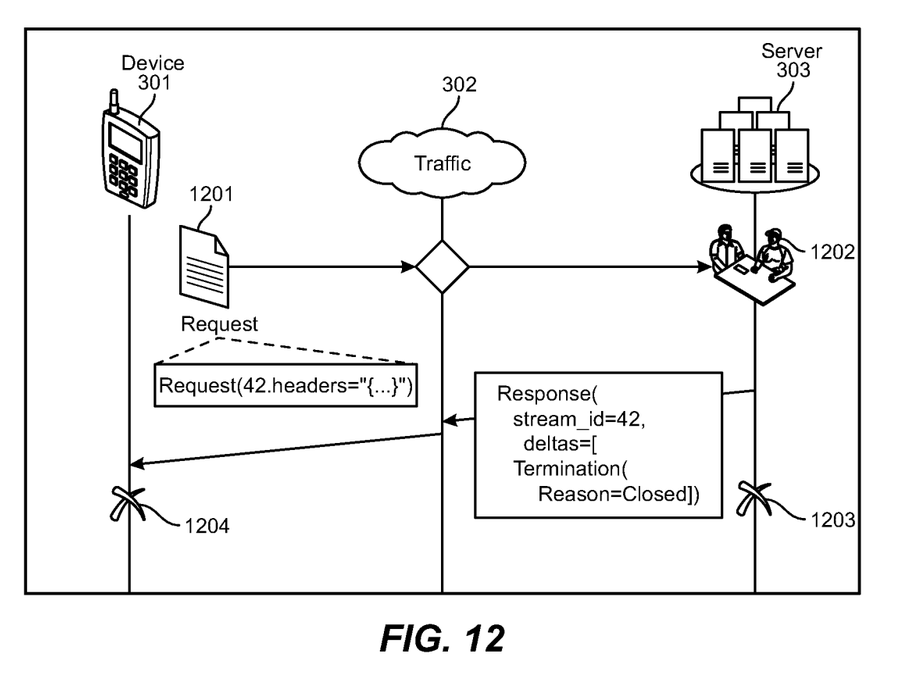
FIG. 12 illustrates an alternative networking architecture in which embedded data transfer promises are implemented to track and resolve issues in a live data stream.
Figure 13:
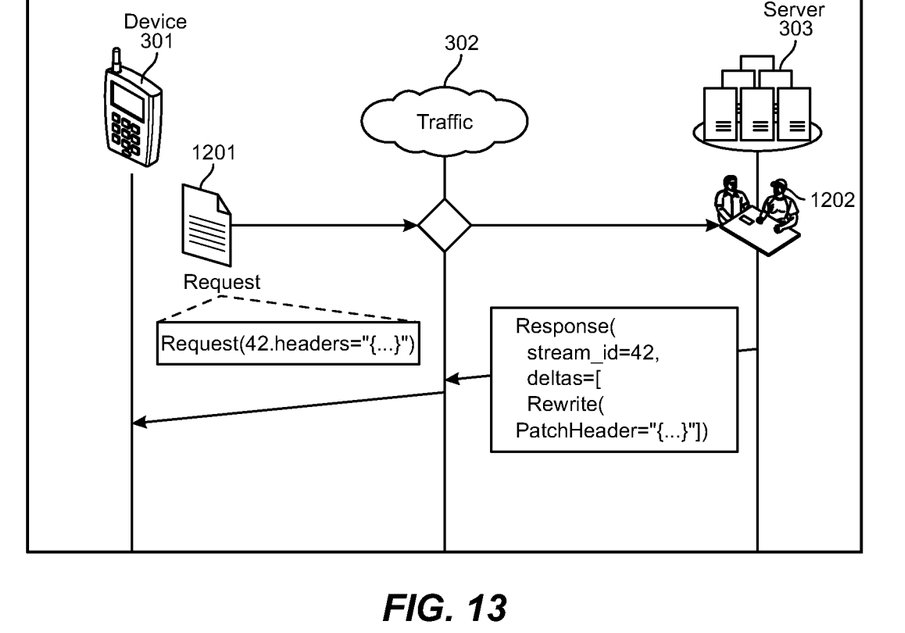
FIG. 13 illustrates an alternative networking architecture in which embedded data transfer promises are implemented to track and resolve issues in a live data stream.
Figure 14:
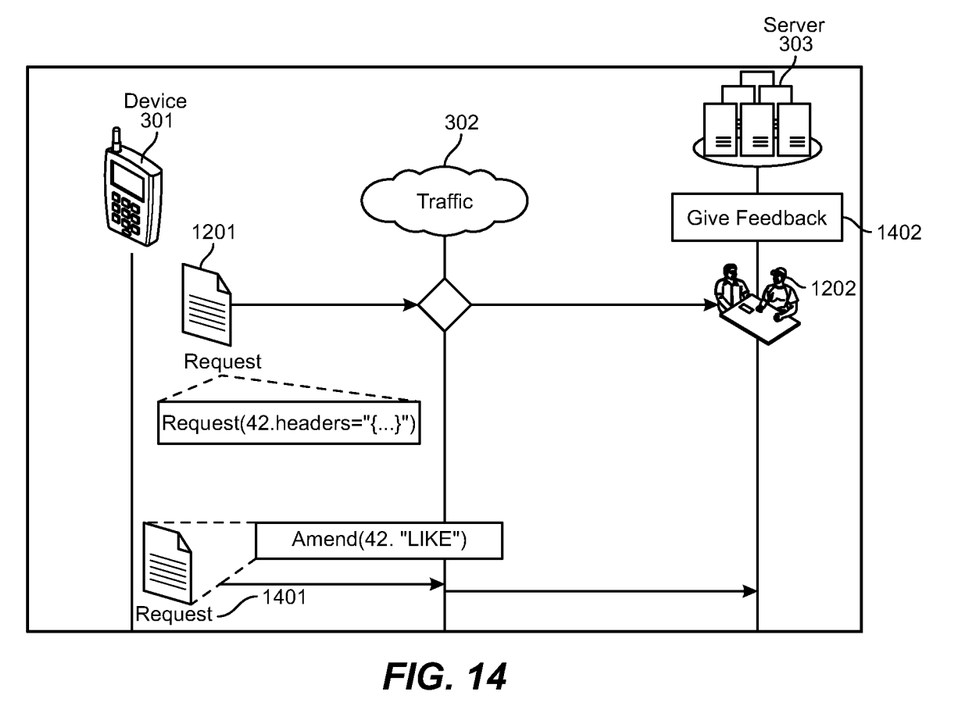
FIG. 14 illustrates an alternative networking architecture in which embedded data transfer promises are implemented to track and resolve issues in a live data stream.

In at least some of the embodiments described above, there may be an infinite amount of data backing a request stream. However, in some examples such as live comments on a post, the post itself may be deleted. As such, the embodiments described herein may consider what happens when the post gets deleted or when the data backing a request stream is otherwise removed. In such cases, the request stream may end and the server 303 may have control over the lifetime of the requests. For example, as shown in FIG. 12, the server 303 may issue a Termination delta in response 1202. The Termination delta may indicate that the server 303 will no longer process the request 1201 for any of a variety of different reasons.

A termination reason "Closed," for example, may indicate that the server is finished with the request and that there will not be any more data associated with that request 1201 (e.g., the post was deleted). A termination reason "Rejected" may indicate that the server looked at the request 1201 and decided to reject it (e.g., because privacy settings for the post were changed). A termination reason "TryAgain" may indicate that the server is not ready or did something to manipulate the routing. A termination reason "Error" may indicate that the server has faulted the stream and that traffic or the device is to retry the transmission. The termination reason may further indicate that the termination occurred on the server side (e.g., 1203) or that the termination occurred for reasons on the client side (e.g., 1204). The termination reason may also indicate to the client whether or not it would be prudent to retry the request.

Termination deltas may affect the promise of data. As such, Stopped messages (e.g., 1003) may be injected into the stream automatically. At least in some cases, this may have the consequence that Error and TryAgain terminations may not be visible up to the client directly, but the promise via FlowStatus will be broken.

In some embodiments, as shown in FIG. 1, the intermediary nodes 103 (which may be similar to or the same as traffic 302 of FIG. 14) may provide an indication 108 (or 1402 of FIG. 14) indicating that status of the embedded data transfer promise 107 was changed during transmission of a live data stream 105. The indication 108 may indicate that the embedded data transfer promise 107 was broken. The indication of a broken data transfer promise may indicate that at some point between the client computer system 101 and the server computer system 110 the transfer of live data 106 over the live data stream 105 failed. The data transfer could have failed at any of the intermediary nodes 103A-103C. In some cases, the broken promise 107 may simply indicate that the data transfer failed at some point. In other cases, the indication 108 may further indicate which network node the embedded data transfer promise was broken at. Thus, for example, the live data 106 may have reached intermediary nodes 103C and 103B, but not node 103A. As such, the indication 108 may indicate that the data transfer promise was broken at intermediary node 103B since that was the last node that received the live data 106.

In some embodiments, the status indication 108 may not only indicate that the data transfer promise was broken and where the break occurred, but may also indicate that the live data stream 105 was restarted at a specified network node. In some cases, this node may be same network node at which the data transfer promise was broken. Thus, in the example above where the live data reached intermediary node 103B but not node 103A on its way to the client 101, the intermediary node 103B may restart transmission of the live data 106 to intermediary node 103A.

This restarting may occur automatically and may start without input from the server 110 or even without the server's knowledge (until subsequently being notified in the status indication 108). This automatic restarting may save a great deal of time that would have otherwise been spent communicating the failure back to the server and waiting for the server to restart the live data stream 105. Once the live data stream 105 has been restarted at intermediary node 103B, the intermediary node 103B may send another status indication 108 indicating that the live data stream 105 has been restarted and that the data transfer promise 107 is again intact. Upon receiving the updated status indication 108, the server 110 may update the current status of the live stream to indicate that the embedded data transfer promise associated with the live data stream 105 is now intact.

When transferring the live data stream 105, the delta data generating module 118 of server 110 may generate delta data

Figure 15:
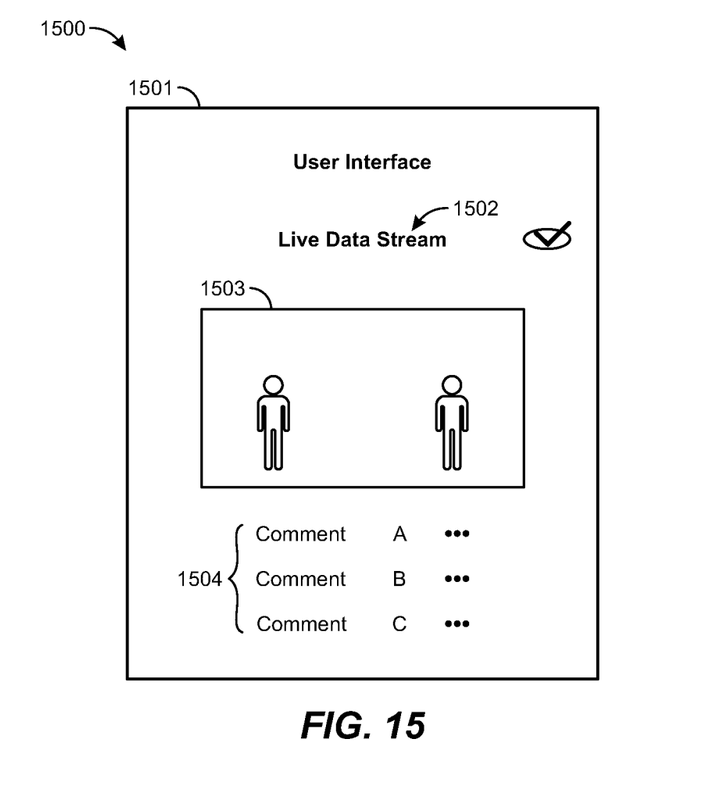
FIG. 15 illustrates an embodiment of a user interface in which live data is streamed to an electronic device.

109. As noted above, this delta data may be sent in batches and may communicate a variety of different types of information. In some cases, the delta data 109 including a flow status indicator indicating whether the live data stream 105 is accepted, started, or stopped (see FIG. 10). The accepted flow status indicator may indicate that the server 110 has promised to transfer the live data requested by the client 101 (e.g., in request 1401 of FIG. 14). As shown in FIG. 15, the live data may correspond to live comments on a live data stream. For instance, in embodiment 1500, user interface 1501 may illustrate a live data stream 1502. The live data stream 1502 may show various users chatting or other content in window 1503. The live comments requested by the client may be shown as Comments A, B, and C at 1504. The comments 1504 may be illustrated on the user interface 1501 as they are received at the server 110 and after being passed through the intermediary nodes 103 (e.g., through traffic 302 of FIG. 14). During this transfer of live data, the server 110 may also transfer delta data 109 to the client indicating request stream status information.

The server 110 may also be configured to monitor the live data stream as it is transmitted to the client 101. For example, the monitoring module 119 of server 110 may monitor the live data stream (e.g., 1502) to determine whether the embedded data transfer promise 107 is subsequently broken at the intermediary network nodes 103 between the server 110 and the client 101 during the course of the live data stream. If the transfer is successful, or if the transfer fails, or if the transfer fails and is restarted at an intermediary node, the monitoring module 119 may take note of what has occurred.

The monitoring module 119 may also generate a measure of reliability for the live data stream 1502. The measure of reliability may indicate a number of times the embedded data transfer promise associated with the live data stream was broken while the monitoring module was performing the monitoring. If the embedded data transfer promise 107 associated with the live data stream was broken more than a threshold number of times during the monitoring, the associated measure of reliability may be reduced or downgraded to reflect the high number of failures. On the other hand, if the live data stream's data transfer promise was not broken or was broken less than the threshold number of times, the measure of reliability may be increased to reflect the lack of disruptions in the data transfer.

In some cases, when the client sends a request (e.g., 102), the request may automatically establish a stream of deltas flowing from the server to the client. The deltas (e.g., delta data 109) may be part of the live data stream 105. The delta data may provide an indication of a state machine's current state including "Accepted," "Started," or "Stopped." The delta data 109 may indicate to the client 101 the current status of the live data stream. As such, the client may be aware of whether it should be expecting the live data 106, or whether the server has stopped providing the live data. Throughout the data transfer process, each intermediary node (e.g., 103) may know whether the embedded data transfer promise 107 was broken at that node. This provides continuity between nodes and allows the server to provide guarantees that, if live data 106 exists and the data transfer promise 107 has not been broken, the live data will reach the client 101.

In some cases, one or more of the intermediary nodes 103 may be a proxy server. Thus, intermediary node 103A, for example, may be a proxy server that lies in the data transfer path between the server 110 and the client 101. In some embodiments, the proxy server may become disconnected from the server 110. This disconnect may break the embedded data transfer promise 107. The proxy server may then notify the server to retry transferring the live data stream. In the notification, the proxy server may note that the live data stream failed at the proxy server. This transfer failure may be shown in a user interface. For example, a graphical indicator such as an icon, button, or window may show a red light or other graphical indication of the current status of the live stream. In some cases, the graphical indicator may provide a green or red indicator for the status of the embedded data transfer promise 107. The graphical indicator may stay green as long as the promise is intact, and may change to red if the promise is been broken. The graphical indicator may also be configured to indicate at which intermediary node the promise was broken.

A corresponding system may include at least one physical processor and physical memory comprising computer-executable instructions that, when executed by the physical processor, cause the physical processor to: receive, at a server, a request from a client for one or more portions of live data, establish, at the server, a data transfer promise that is embedded in a live data stream, the live data stream including the requested live data, transfer the live data stream with the embedded data transfer promise to the client, receive an indication that the status of the embedded data transfer promise was changed during transmission of the live data stream and provide, to the client, an indication of the current status of the live stream based on the received status indication.

A non-transitory computer-readable medium may include one or more computer-executable instructions that, when executed by at least one processor of a computing device, cause the computing device to: receive, at a server, a request from a client for one or more portions of live data, establish, at the server, a data transfer promise that is embedded in a live data stream, the live data stream including the requested live data, transfer the live data stream with the embedded data transfer promise to the client, receive an indication that the status of the embedded data transfer promise was changed during transmission of the live data stream, and provide, to the client, an indication of the current status of the live stream based on the received status indication.

Accordingly, methods and systems may be provided which allow a client and computer system to receive live data in a data stream and to know if and where the data stream transfer broke down. These methods and systems also allow intermediary nodes along the data transfer path between the server and the client to automatically restart the data stream from any of the intermediary nodes without notifying the server and without waiting for the server to restart the data stream. Using these systems and methods, client devices may be provided with guarantees that if live data is available, they will be receiving that data in an efficient and robust manner.

Example Embodiments

Example 1: A computer-implemented method may include receiving, at a server, a request from a client for one or more portions of live data; establishing, at the server, a data transfer promise that is embedded in a live data stream, the live data stream including the requested live data; transferring the live data stream with the embedded data transfer promise to the client; receiving an indication that the status of the embedded data transfer promise was changed during transmission of the live data stream; and providing, to the client, an indication of the current status of the live stream based on the received status indication.

Example 2. The computer-implemented method of Example 1, wherein the indication indicating that status of the embedded data transfer promise was changed during transmission of the live data stream indicates that the embedded data transfer promise was broken.

Example 3. The computer-implemented method of any of Examples 1 and 2, wherein the indication further identifies which network node the embedded data transfer promise was broken at.

Example 4. The computer-implemented method of any of Examples 1-3, wherein the indication further indicates that the live data stream was restarted at the identified network node.

Example 5. The computer-implemented method of any of Examples 1-4, wherein the indication further indicates that the embedded data transfer promise is now intact.

Example 6. The computer-implemented method of any of Examples 1-5, wherein the server updates the indication of the current status of the live stream based on the further indication that the embedded data transfer promise is now intact.

Example 7. The computer-implemented method of any of Examples 1-6, further comprising generating, at the server and as part of the embedded data transfer promise, one or more portions of delta data, the delta data including a flow status indicator.

Example 8. The computer-implemented method of any of Examples 1-7, wherein the flow status indicator is configured to indicate to the client that the server has promised to transfer the requested live data.

Example 9. The computer-implemented method of any of Examples 1-8, wherein the server transfers the requested live data including the delta data to the client.

Example 10. The computer-implemented method of any of Examples 1-9, further comprising monitoring the live data stream to determine whether the embedded data transfer promise is subsequently broken at one or more network nodes between the server and the client over at least a portion of the duration of the live data stream.

Example 11. The computer-implemented method of any of Examples 1-10, further comprising generating a measure of reliability for the live data stream, the measure of reliability indicating a number of times the embedded data transfer promise associated with the live data stream was broken during the monitoring.

Example 12. A system may include the following: at least one physical processor and physical memory comprising computer-executable instructions that, when executed by the physical processor, cause the physical processor to: receive, at a server, a request from a client for one or more portions of live data, establish, at the server, a data transfer promise that is embedded in a live data stream, the live data stream including the requested live data, transfer the live data stream with the embedded data transfer promise to the client, receive an indication that the status of the embedded data transfer promise was changed during transmission of the live data stream and provide, to the client, an indication of the current status of the live stream based on the received status indication.

Example 13. The system of Example 12, wherein the request from the client automatically establishes a stream of deltas flowing from the server to the client.

Example 14. The system of any of Examples 12 and 13, wherein each node between the server and the client knows whether the embedded data transfer promise was broken at that node.

Example 15. The system of any of Examples 12-14, wherein at least one proxy server lies in a data transfer path between the server and the client.

Example 16. The system of any of Examples 12-15, further comprising: determining that the proxy server has become disconnected from the server, breaking the embedded data transfer promise at the proxy server, and notifying the server to retry transferring the live data stream.

Example 17. The system of any of Examples 12-16, wherein the indication of the current status of the live stream comprises a graphical indicator.

Example 18. The system of any of Examples 12-17, wherein the live data comprises live comments on a video stream.

Example 19. The system of any of Examples 12-18, wherein the embedded data transfer promise is implemented as part of a protocol.

Example 20. A non-transitory computer-readable medium may include one or more computer-executable instructions that, when executed by at least one processor of a computing device, cause the computing device to: receive, at a server, a request from a client for one or more portions of live data, establish, at the server, a data transfer promise that is embedded in a live data stream, the live data stream including the requested live data, transfer the live data stream with the embedded data transfer promise to the client, receive an indication that the status of the embedded data transfer promise was changed during transmission of the live data stream, and provide, to the client, an indication of the current status of the live stream based on the received status indication.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to monitor a live data transfer, use the result of the transformation to determine the current status of the live data transfer, and store the result of the transformation to identify status changes over time. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, at a server, a request from a client for one or more portions of live data;
   establishing, at the server, a data transfer promise that is embedded in a live data stream, the live data stream including the requested live data;
   transferring the live data stream with the embedded data transfer promise to the client through one or more intermediary nodes, the embedded data transfer promise allowing the live data stream to be restarted from any of the one or more intermediary nodes;
   receiving an indication that a current status of the embedded data transfer promise was changed during transmission of the live data stream; and
   providing, to the client, an indication of the current status of the live stream based on the received status indication, the received status indication including a specified acknowledgement level that indicates the level to which the live data stream was acknowledged.

2. The computer-implemented method of claim 1, wherein the indication indicating that status of the embedded data transfer promise was changed during transmission of the live data stream indicates that the embedded data transfer promise was broken.

3. The computer-implemented method of claim 2, wherein the indication further identifies which network node the embedded data transfer promise was broken at.

4. The computer-implemented method of claim 3, wherein the indication further indicates that the live data stream was restarted at the identified network node.

5. The computer-implemented method of claim 4, wherein the indication further indicates that the embedded data transfer promise is now intact.

6. The computer-implemented method of claim 5, wherein the server updates the indication of the current status of the live stream based on the further indication that the embedded data transfer promise is now intact.

7. The computer-implemented method of claim 1, further comprising generating, at the server and as part of the embedded data transfer promise, one or more portions of delta data, the delta data including a flow status indicator.

8. The computer-implemented method of claim 7, wherein the flow status indicator is configured to indicate to the client that the server has promised to transfer the requested live data.

9. The computer-implemented method of claim 8, wherein the server transfers the requested live data including the delta data to the client.

10. The computer-implemented method of claim 1, further comprising monitoring the live data stream to determine whether the embedded data transfer promise is subsequently broken at one or more network nodes between the server and the client over at least a portion of the duration of the live data stream.

11. The computer-implemented method of claim 10, further comprising generating a measure of reliability for the live data stream, the measure of reliability indicating a number of times the embedded data transfer promise associated with the live data stream was broken during the monitoring.

12. A system comprising:
   at least one physical processor; and physical memory comprising computer-executable instructions that, when executed by the physical processor, cause the physical processor to:
- receive, at a server, a request from a client for one or more portions of live data;
- establish, at the server, a data transfer promise that is embedded in a live data stream, the live data stream including the requested live data;
- transfer the live data stream with the embedded data transfer promise to the client through one or more intermediary nodes, the embedded data transfer promise allowing the live data stream to be restarted from any of the one or more intermediary nodes;
- receive an indication that a current status of the embedded data transfer promise was changed during transmission of the live data stream; and
- provide, to the client, an indication of the current status of the live stream based on the received status indication, the received status indication including a specified acknowledgement level that indicates the level to which the live data stream was acknowledged.

13. The system of claim 12, wherein the request from the client automatically establishes a stream of deltas flowing from the server to the client.

14. The system of claim 12, wherein each node between the server and the client knows whether the embedded data transfer promise was broken at that node.

15. The system of claim 12, wherein at least one proxy server lies in a data transfer path between the server and the client.

16. The system of claim 15, further comprising:
- determining that the proxy server has become disconnected from the server;
- breaking the embedded data transfer promise at the proxy server; and
- notifying the server to retry transferring the live data stream.

17. The system of claim 12, wherein the indication of the current status of the live stream comprises a graphical indicator.

18. The system of claim 12, wherein the live data comprises live comments on a video stream.

19. The system of claim 12, wherein the embedded data transfer promise is implemented as part of a protocol.

20. A non-transitory computer-readable medium comprising one or more computer-executable instructions that, when executed by at least one processor of a computing device, cause the computing device to:
- receive, at a server, a request from a client for one or more portions of live data;
- establish, at the server, a data transfer promise that is embedded in a live data stream, the live data stream including the requested live data;
- transfer the live data stream with the embedded data transfer promise to the client through one or more intermediary nodes, the embedded data transfer promise allowing the live data stream to be restarted from any of the one or more intermediary nodes;
- receive an indication that a current status of the embedded data transfer promise was changed during transmission of the live data stream; and
- provide, to the client, an indication of the current status of the live stream based on the received status indication, the received status indication including a specified acknowledgement level that indicates the level to which the live data stream was acknowledged.

* * * * *